Figure 1:
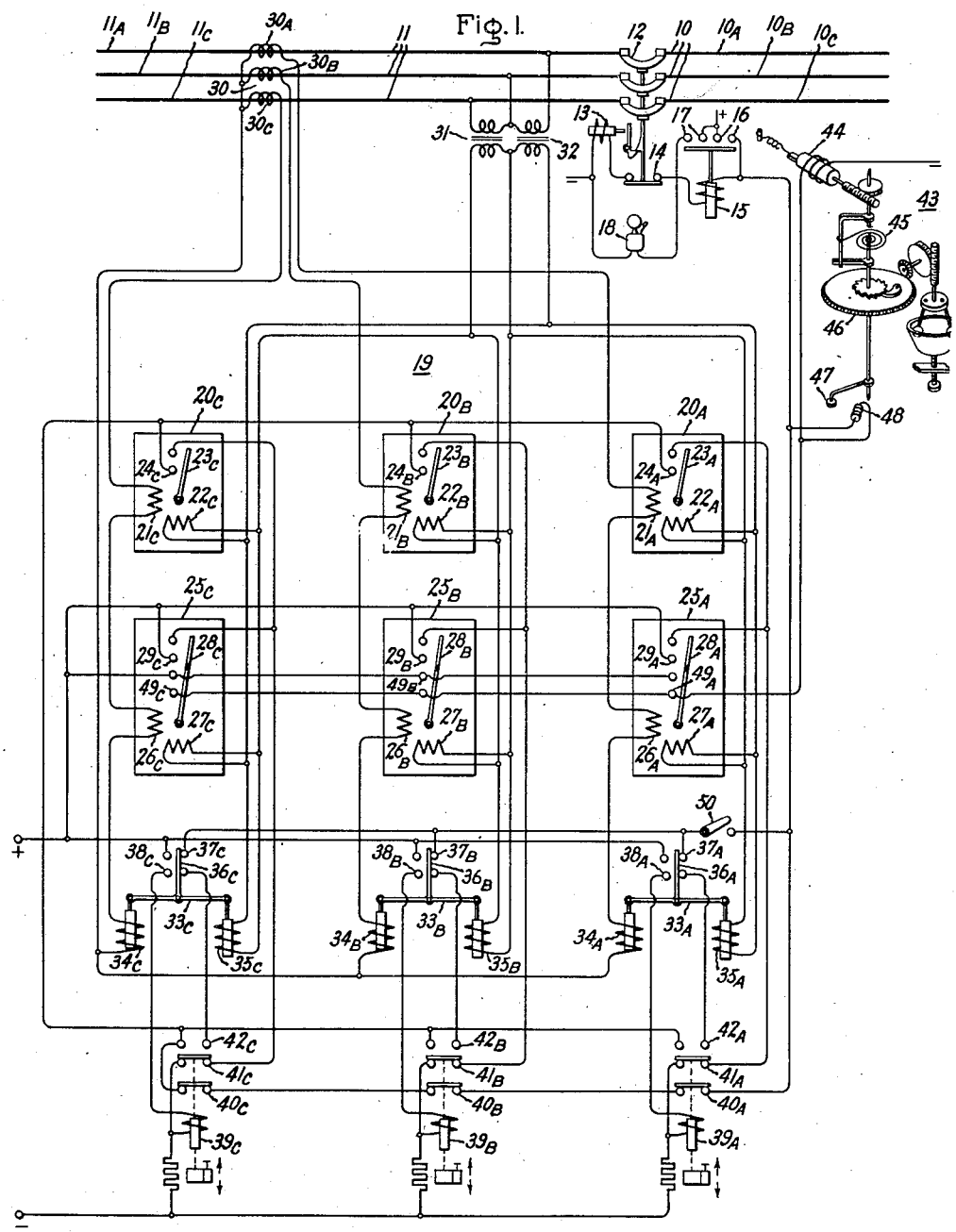

Oct. 10, 1944.   A. R. VAN C. WARRINGTON   2,360,182
PROTECTIVE ARRANGEMENT FOR ALTERNATING-CURRENT SYSTEMS
Filed Dec. 23, 1941   3 Sheets-Sheet 1

Inventor:
Albert R. van C. Warrington,
by Harry E. Dunham
His Attorney.

Patented Oct. 10, 1944

2,360,182

UNITED STATES PATENT OFFICE 2,360,182

PROTECTIVE ARRANGEMENT FOR ALTERNATING CURRENT SYSTEMS

Albert R. van C. Warrington, Wallingford, Pa., assignor to General Electric Company, a corporation of New York Application December 23, 1941, Serial No. 424,158

9 Claims. (Cl. 175—294)

My invention relates to improvements in protective arrangements for alternating-current systems and more particularly to an improved protective arrangement wherein false effective operation of the protective relays upon the occurrence of asynchronous conditions, such as power swings on the system, is prevented. Specifically, my invention is concerned with an improvement on United States Letters Patent 2,141,896, granted December 27, 1938, and assigned to the same assignee as the present application.

For some time, protective systems have been used in which asynchronous conditions, such as power swings or oscillations, have been distinguished from all phase fault conditions except three-phase faults on the theory that a power swing is like a three-phase fault in the way it affects the protective relays associated with the various phase conductors. If a fault detector is provided for each phase conductor of a three-phase system then, based on the above theory, the three fault detectors will open and close their contacts simultaneously under power-swing conditions. To block false tripping under such power-swing conditions, the prior-art arrangements for a three-phase system often utilized the simultaneous operation of three fault detectors. If any one of the three fault detectors did not operate, then blocking by opening the trip circuit, for example, was not initiated. The above-mentioned theory that a power swing acts in many respects, in so far as the operation of protective relays is concerned, like a three-phase fault presupposes that the power swing results or occurs after the clearing of a fault. As a matter of fact, however, I have found that, in a great many cases, unfortunately, the fault that causes the power-swing condition is usually still in existence when blocking to prevent false effective operation of the protective relays is required. A power swing caused by a fault may have both fault and swing current existing at the same time, which two different currents may buck or boost each other in the various phase conductors to upset the symmetry which usually exists under power-swing conditions. As a matter of fact, the resultant current due to the combined swing and fault current in a certain phase conductor of the system may be such as to prevent the operation of the prior-art blocking means under swing conditions even though no fault exists on the protected section of the system. In other words, the fault current due to an external fault combined with the swing current in at least one phase conductor of a polyphase system may produce a resultant current which is insufficient to cause operation of the corresponding fault detector so that, where all three fault detectors must be simultaneously operated to block effective operation of the protective relays under power-swing conditions, false tripping of the circuit breakers would result.

For the reasons set forth above, those prior-art power-swing blocking schemes including a blocking means for each phase conductor, which blocking means can only block the effective operation of the protective relays associated with the same phase conductor, also permit false tripping of the circuit breakers under swing conditions accompanied by an external fault. Accordingly, it would be desirable to provide a power-swing blocking scheme in which means for distinguishing between faults and power swings are provided for each of the various phase conductors of a polyphase system and in which any one of these separate means may serve to block effective operation of protective relays associated with any of the phase conductors so that false tripping will be prevented under substantially all power-swing conditions.

Another manner of distinguishing power swings or oscillations from fault conditions such as short circuits, which has been used in connection with distance relaying, for example, is based on the so-called "progression-of-events theory." When a short circuit occurs on the system for which a protective distance relay should operate, its voltage, current, and the phase angle between them instantly change from their normal values to the values capable of operating such a distance relay but, during a power swing or oscillation, the voltage, current, and the phase angle change more slowly from values incapable of operating the distance relay to the necessary operating values. Consequently, if two relays are provided which depend for their operation on the current and voltage of the circuit as well as the angular relation between them and one of these relays is adjusted to be more sensitive than the other, then a power swing may be detected by the operation of one of these relays a predetermined time ahead of the operation of the other of these relays whereas, under fault conditions, the two relays would operate substantially simultaneously. In the former case involving a power-swing condition, an apparent slow change in impedance results while, under conditions involving a fault, substantially an instantaneous change in impedance occurs. This difference in time required by power swings and faults to reach the electrical conditions of a circuit necessary to operate protective relays and the means for utilizing this difference are broadly claimed in United States Letters Patent 2,030,665, assigned to the same assignee as the present application. It would be desirable to utilize this means for differentiating between power swings and faults based on the progression-of-events theory for blocking the operation of distance relays under power-swing conditions in such a manner that false tripping due to power swings could not occur by providing means associated with each phase conductor for blocking effective operation of the protective relays associated with the same or any other phase conductor of the system under power-swing conditions.

Accordingly, it is an object of my invention to provide a new and improved protective system in which false operation under asynchronous conditions is substantially eliminated.

It is another object of my invention to provide a power-swing blocking scheme to prevent false operation of a protective system under power-swing conditions including separate means associated with each of the several phase conductors of the system being protected wherein any one of these separate means may serve to block false effective operation of protective relays associated with the same or any of the other phase conductors.

It is another object of my invention to provide a power-swing blocking scheme for a protective system employing distance relays in which each phase conductor of the system is provided with means for recognizing a power-swing condition and any of these means are capable of blocking false effective operation of the distance relays associated with any other phase conductor of the system.

Further objects and advantages of my invention will become apparent as the following description proceeds and the features of novelty which characterize my invention will be pointed out with particularity in the claims annexed to and forming a part of this specification.

Figure 2:
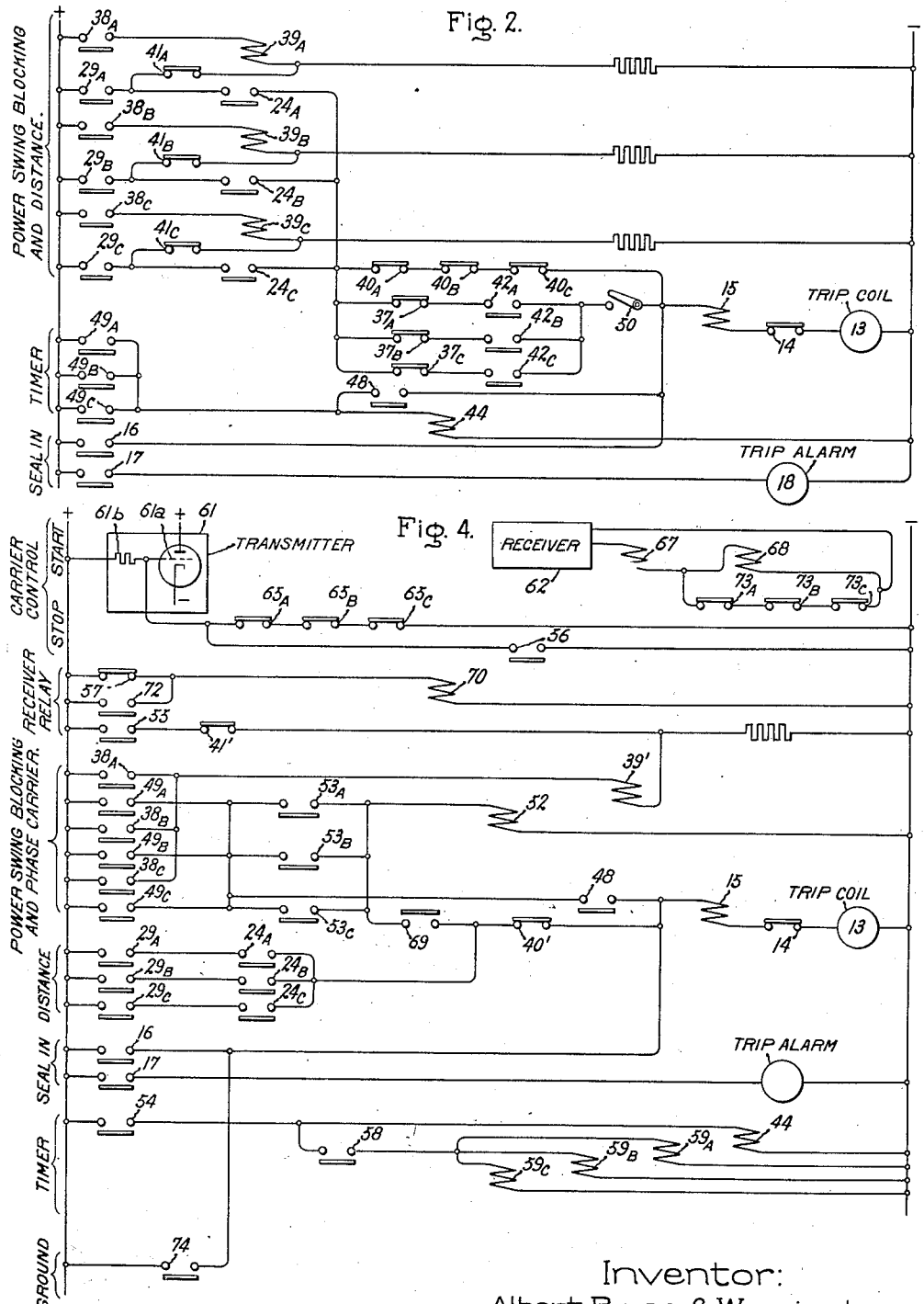
Figure 3:
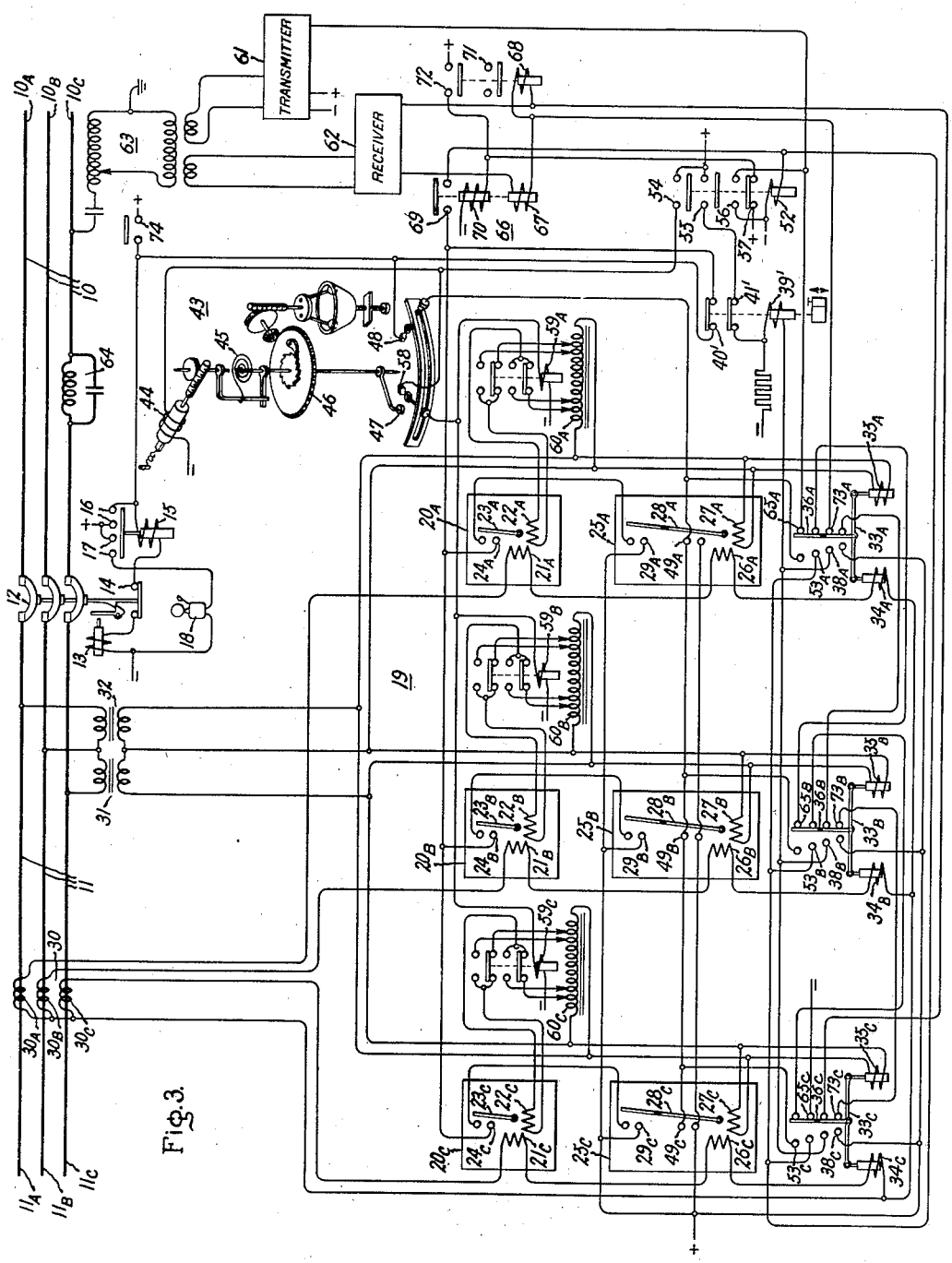

For a better understanding of my invention, reference may be had to the accompanying drawings in which Fig. 1 diagrammatically illustrates a protective system embodying my invention, Fig. 2 is an elementary diagram of the protective arrangement shown in Fig. 1, Fig. 3 diagrammatically illustrates another embodiment of my invention, and Fig. 4 is an elementary diagram of the protective arrangement shown in Fig. 3.

Referring now to Fig. 1 of the drawings, I have illustrated my protective system as applied to protecting a section 10 of a three-phase alternating-current system. This section includes phase conductors 10A, 10B, and 10C, respectively and is connected to a similar section or to another portion of the system indicated as section 11 and comprising phase conductors 11A, 11B, and 11C, respectively. Sections 10 and 11 of the three-phase alternating-current system are illustrated as being interconnected through a suitable circuit-interrupting means, such as latched closed circuit breaker 12. Only a small portion of section 10 of the alternating-current system is shown but it will be understood by those skilled in the art that the remote end thereof is connected to the next section of the system through a circuit-interrupting device similar to circuit breaker 12 and, in the event of a fault on section 10, circuit breaker 12 and the circuit breaker at the remote end are opened to isolate this section from the sound portions of the system. Since the protective system for operating the circuit breaker at the remote end of section 10 will be substantially identical with the protective system for operating circuit breaker 12, only the latter is shown in the drawings and described hereinafter although it will be obvious to those skilled in the art that isolation of section 10 from the rest of the associated system will result only upon operation of the circuit-interrupting means at both ends thereof.

Circuit breaker 12 is preferably provided with a trip coil 13 and an "a" auxiliary switch having contacts 14 which are closed when the circuit breaker is closed and open when the circuit breaker is open. The circuit of the trip coil 13 is preferably provided with a seal-in relay 15 having contacts 16 to by-pass the more delicate protective relay contacts and to insure a definitely maintained energization of the trip coil once the protective relay contacts have operated to initiate its energization. Seal-in relay 15 may also be provided with an additional set of normally open contacts 17 for energizing a suitable alarm 18 in the event that isolation of section 10 from the rest of the alternating-current system is initiated.

In order to protect the alternating-current system from faults occurring on section 10 thereof to cause isolation of section 10 under these conditions, I provide a distance-responsive protective system generally indicated at 19 which may be either of the impedance or reactance type. This protective system preferably comprises three distance-responsive devices or ohm units 20 specifically designated as 20A, 20B, and 20C, respectively, depending upon the particular phase conductor of the alternating-current system from which the ohm units 20 are energized or with which they are associated. These ohm units 20 are schematically illustrated as comprising a current winding 21 and a potential winding 22 designated by the appropriate subscript A, B, or C. A movable contact arm 23 is associated with each of the ohm units 20 and adapted to control the bridging of contacts 24 which are arranged in parallel with one another and connected in the trip circuit of trip coil 13. Distance-responsive relays or ohm units 20 may be impedance units of the balanced-beam type or the like or may be reactance type of ohm units such as are disclosed in my prior United States Letters Patent 2,214,866, granted September 17, 1940, and assigned to the same assignee as the present application.

Since many distance relays are not inherently directional in nature, they will respond to faults in either direction therefrom within the reach thereof and, consequently, in order to control circuit interrupter 12 only in response to faults on section 10 of the alternating-current system, it is necessary to provide directional-responsive units hereinafter referred to as starting units for preventing the ohm units 20 from becoming effective to operate circuit breaker 12 unless the fault is in section 10 of the system. These starting units, generally indicated at 25 and specifically designated as 25A, 25B, and 25C, respectively, are schematically indicated as both including a current winding 26 and a potential winding 27, which windings are designated by the appropriate subscript, depending upon the particular phase conductors with which they are associated. Starting units 25 are each provided with a movable contact-controlling member 28 adapted to control contacts 29, which contacts for the different starting units are connected in parallel with each other. However, each of the sets of contacts 29 of the starting units 25 are connected in series with the corresponding contacts 24 of the corresponding ohm units 20; in other words, contacts 24A are in series with contacts 29A, contacts 24B are in series with contacts 29 B, and contacts 24c are in series with contacts 29c so that tripping of circuit breaker 12 cannot result merely upon operation of one of the ohm units 20 unless the corresponding one of the starting units 25 has also operated to close its contacts 29, indicating that the direction of power flow is such that the fault is in section 10 of the alternating-current system.

Since my invention is primarily concerned with a new and improved means for distinguishing between fault conditions on the alternating-current system and power-swing conditions, I have disclosed my protective system 19 as adapted to give protection only against phase faults since, where actual ground current flows, no difficulty is encountered in distinguishing power swings and faults. It should be understood, however, that suitable means for operating circuit breaker 12 in response to ground faults would also be provided, which means has been omitted merely for the sake of simplification since it forms no part of my invention. Accordingly, the current windings 21 of the ohm units 20 and the current windings 26 of the starting or directional units 25 are energized in response to the appropriate line currents flowing in phase conductors 10A, 10B, or 10c by means of suitable current transformers associated with the alternating-current system and illustrated as having secondary windings 30 specifically designated as 30A, 30B, or 30c, depending upon the particular phase conductor 11A, 11B, or 11c with which they are associated.

The potential windings 22 and 27 of ohm units 20 and starting units 25, respectively, are energized with line-to-line potentials through potential transformers 31 and 32. Specifically, potential windings 22A and 27A are energized with the potential AB obtained across phase conductors 11A and 11B; potential windings 22B and 27B are energized with the potential BC obtained across phase conductors 11B and 11c, and potential windings 22c and 27c are energized with the potential CA obtained across phase conductors 11c and 11A.

As has been pointed out above, one can differentiate between oscillations or power swings and short circuits or fault conditions by the progress of events leading up to the point where a distance relay will operate. In order to distinguish between faults and power oscillations based on the progress of events, I provide a plurality of fault detectors 33A, 33B, and 33c which are illustrated as of the balanced-beam type having current windings 34 and potential windings 35, each of these current and potential windings being designated by the appropriate subscript A, B, or C. The current winding 34A is connected in series with the current windings 21A and 26A of the ohm unit 20A and the starting unit 25A, respectively. Similarly, the current windings 34B and 34c are connected in series with the corresponding current windings of the corresponding ohm and starting units 20 and 25, respectively. The potential winding 35A is energized with the same potential as potential windings 22A and 27A of ohm unit 20A and starting unit 25A, respectively. Similarly, the potential windings 35B and 35c are energized with the same potentials as the windings 22 and 27 of the corresponding ohm and starting units, respectively. The fault detectors 33 are each provided with a movable contact arm 36 designated by the appropriate subscript A, B, or C, which contact arm is adapted to control normally closed contacts 37 and normally open contacts 38.

The fault detectors 33 are purposely adjusted to be more sensitive than the corresponding starting units 25 and hence will operate earlier than the starting units in the progression of events during a power swing or oscillation while, during a fault condition, the fault detectors 33 and the starting units 25 will operate substantially instantaneously.

Although it may sometimes be desirable to provide a protective system which will operate a circuit breaker on severe power-swing conditions or out-of-step conditions to subdivide the system better to permit recovery from such severe asynchronous conditions, I have illustrated my invention as applied to a system in which means are provided to prevent tripping of the circuit breakers on power-swing conditions by distinguishing between such power-swing conditions and fault conditions. Accordingly, I have provided a plurality of blocking relays 39A, 39B, and 39c, which are energized from a source of direct-current potential through the normally open contacts 38A, 38B, or 38c, respectively, of the fault detectors 33. Each blocking relay 39 is provided with two sets of normally closed contacts 40 and 41, respectively, and a set of normally open contacts 42 which are designated by the appropriate subscripts A, B, or C in the drawings. Blocking relays 39 may each be provided with a time-delay means as schematically illustrated or may be constructed so as inherently to have a few cycles delay in closing their normally opened contacts and in opening their normally closed contacts upon energization thereof. Such relays will also have a greater delay, of the order of one second, in the reverse direction upon deenergization thereof.

To prevent blocking relays 39 from operating under conditions when fault detectors 33 and starting units 25 operate substantially instantaneously indicating a fault condition rather than a power swing, I have arranged each of the sets of contacts 29 of starting units 25 in a circuit including the normally closed contacts 41 of the corresponding fault detector 33 to parallel or short circuit the windings of the corresponding blocking relays 39. During a power swing or oscillation, therefore, fault detector 33A, for example, will operate before starting unit 25A and, by closing its normally open contacts 38A, will energize blocking relay 39A. After a time delay of a few cycles, the blocking relay 39A will open its normally closed contacts 40A and 41A and will close its normally open contacts 42A, whereupon the subsequent operation of starting unit 25A to close its contacts 29A cannot affect the operation of blocking relay 39A since its winding cannot be short circuited by virtue of the fact that contacts 41A connected in this parallel circuit have been opened. The operation of the starting units, fault detectors, and blocking relays, designated by the subscripts B and C will be identical with that just described with reference to the similar devices designated by the subscript A.

To prevent such a power swing or oscillation, which has resulted in the energization of blocking relays 39, from causing circuit breaker 12 to be tripped due to the fact that the electrical conditions of the circuit are such as to indicate an apparent fault condition, causing one or more of the ohm units 20 and corresponding starting units 25 to operate, I connect the normally closed contacts 40A, 40B, and 40c of the blocking relays 39A, 39B, and 39c, respectively, in series with one another in the circuit of the trip coil 13, thereby preventing tripping of circuit breaker 12 whenever any one of the blocking relays 39A, 39B, or 39c has operated to open these contacts. If contacts 40 remained closed, the tripping circuit in such a case would be completed through any ohm unit and corresponding starting unit which have operated to close their respective contacts. If, on the other hand, a fault or short-circuit condition occurs within the operating range of the starting units 25, the contacts 38 of one or more of the fault detectors and the contacts 29 of one or more of the corresponding starting units will both close almost simultaneously so that the windings 39 of the corresponding blocking relays are short circuited before the blocking relays have had time to operate to open the normally closed contacts 41. Consequently, blocking relays 39 will operate during a power swing or oscillation but will not operate for a short circuit or fault.

With the arrangement just described, the operation of any one of the blocking relays 39 will block tripping of circuit breaker 12 so that it is possible to block the tripping action of relays in one phase conductor in dependence upon the relationship of electrical quantities in a different phase conductor and it is not necessary as in the prior-art devices that the conditions of all the phase conductors of the system must be such as to indicate a power-swing condition before blocking of the trip circuit may be initiated. For example, a fault may exist on the "A" phase conductor outside the range for which ohm unit 20 is designed to protect which should be cleared by remote circuit breakers, not shown. If a power-swing condition now occurs, the ohm unit 20A and the starting unit 25A might close their contacts to initiate tripping. However, the current conditions in phase conductor A due to a combination of the external fault current and the swing current may be such as to be insufficient to pick up the fault detector 33A so that blocking relay 39A will not prevent tripping of circuit breaker 12. However, in at least one of the other phase conductors, the power-swing condition will be detected and the blocking relays 39B or 39c or both will operate, any one of which will prevent false tripping by the ohm and starting units associated with the "A" phase conductor.

It will be understood by those skilled in the art that distance relays are quite often provided with a stepped time-distance characteristic such that, in Fig. 1, for example, circuit breaker 12 may be tripped substantially instantaneously for all faults in section 10 of the alternating-current system up to a given percentage of its total length from circuit breaker 12, for example, 90 per cent of the section, and a time delay tripping for faults beyond this point and over a predetermined distance into the next section beyond the remote end of section 10 and a still greater time-delay tripping to take care of conditions which may arise due to failure of some particular relay. To accomplish this purpose, I provide a timing unit generally indicated at 43. In order to obtain the second time step, timing unit 43 may preferably be provided with contacts for controlling auxiliary relays, not shown in Fig. 1 but shown in Fig. 3, to be described hereinafter which will vary the impedance or reactance setting of the ohm units 20 by changing the energization of the potential windings, for example. Such an arrangement is disclosed in my prior Patent 2,214,866 referred to above. For simplifying the disclosure, these contacts have been eliminated from Fig. 1 as have also the auxiliary relays for varying the energization of the potential windings 22 since this feature forms no part of my present invention. As illustrated, the timing unit 43 includes an electromagnetic motor unit 44 which, when energized, stores energy in a spring 45. This energy is released through a suitable mechanism 46 to actuate a movable contact-controlling member 47 adapted to bridge contacts 48, which contacts are connected in the trip circuit or circuit breaker 12 in series with each one of the normally open contacts 49A, 49B, and 49c provided on starting units 25A, 25B, and 25c, respectively, the contacts 49A, 49B, and 49c being arranged in parallel with one another. The timing unit motor 44 is connected in series with a source of direct current and the parallel arranged contacts 49 of starting units 25 so that operation of any one of the starting units 25 to close its corresponding contacts 49 will initiate operation of timing unit 43. If the fault has not been cleared before contact-controlling member 47 bridges contact 48 of the timing unit and one or more of the starting units 25 still have their contact-controlling members 28 bridging contacts 49, tripping of circuit breaker 12 directly through timing unit 43 and one or more of the starting units 25 will result, thereby affording time-delay tripping in the event of failure of one of the relays which should have cleared the fault before contacts 48 closed. It should be understood by those skilled in the art that, instead of providing a single timing unit as shown, a separate timing unit for each of the phase conductors of the system might be provided.

The arrangement described heretofore provides means for opening the trip circuit during power swings or oscillations to prevent false tripping under such conditions and this blocking may be accomplished in response to the electrical conditions in any phase conductor of the system. It might be desirable under certain conditions to be able to open circuit breaker 12 in the event of a fault which might occur after a power-swing condition has initiated the blocking action by opening the trip circuit through operation of one or more of the relays 39. To accomplish this end, means must be provided for reclosing the trip circuit opened by operation of one or more of the blocking relays 39. I have discovered that, during each period of an oscillation or power swing corresponding to the time when the oscillating generators are passing through the in-phase position, there is a limited interval of time when the only current flowing is substantially that due to the fault alone. For this short interval of time, the trip circuit may safely be reclosed so that the distance relays may take over control to protect against faults that might have occurred during the power-swing condition. For all except three-phase faults, one or more of the fault detectors 33 will reset during this period when the only current flowing is substantially that due to the fault current, that is, those fault detectors which operate on current from the unfaulted phase conductors will reset. Accordingly, I have arranged each of the sets of normally open contacts 42 of blocking relays 39 in series with th corresponding normally closed contacts 36 of fault detectors 33. In other words, the contacts 36A are connected in series with the contacts 42A, the contacts 36B in series with the contacts 42B, and the contacts 36c in series with the contacts 42c. Furthermore, I have arranged these sets of serially connected contacts in parallel with one another and this series-parallel combination is connected so as to parallel the circuit including the serially arranged contacts 40A, 40B, and 40c of the corresponding blocking relays 39 through a manually operable switch 50. The manual switch 50 is provided so that this feature providing tripping for faults occuring during the power swing may or may not be used depending upon the desires of the operator. For all faults except three-phase faults, one or more of the fault detectors 33 will reclose for short intervals during the successive periods of power swings, whereupon the corresponding blocking relays 39 will be deenergized. However, prior to the operation of relays 39 upon such deenergization, the trip circuit is completed for a short interval of time through the contacts 37 of one or more fault detectors 33 which have been reset and the contacts 42 of one or more of the corresponding blocking relays 39 which have not yet been opened and, consequently, if a fault exists within the protected section during this time, the distance relays will cause tripping of circuit breaker 12. In the case of three-phase faults, however, none of the fault detectors 33 will reset and tripping of the circuit breaker 12 will occur through the back-up protection provided by the contacts 48 of timing unit 43. In many cases, this back-up protection is sufficient and it is unnecessary to provide the additional protection afforded by the arrangement of contacts 37 of fault detectors 33 and the contacts 42 of blocking relays 39.

The operation of the distance-relay protective scheme including my power-swing blocking arrangement can best be understood by reference to Fig. 2 which is an elementary diagram of the direct-current control circuit wherein the relay contacts are designated by the same reference numerals as in Fig. 1 and the relay windings are designated by the same number as are the relays in Fig. 1. In the event of any phase fault occurring on section 10 within the reach of the distance relays at the end of section 10 adjacent section 11, one or more of the starting units 25 and the ohm units 20 will operate to close their contacts 24 and 29, respectively. Also, under such conditions, one or more fault detectors 33 will operate to close their contacts 38, thereby tending to energize one or more of the blocking relays 39. However, since the corresponding starting units 25 operate prior to the opening of contacts 41 of the time delay pick-up type of blocking relays 39, the windings of these relays are short circuited so that the contacts 40 thereof remain closed and the tripping circuit is completed through seal-in relay 15 and the contacts 14 of the "a" switch. Energization of the seal-in relay 15 closes contacts 16 and 17 which by-pass the contacts of the protective relays and energize trip alarm 18, respectively.

In the event of a power swing, the progression of events will be such that one or more of the sets of fault detector contacts 38 will close sufficiently in advance of the closing of one or more of the sets of contacts 29 of the starting units 25 so that one or more of the blocking relays 39 having a time-delay pick-up will open the corresponding contacts 41 thereof to prevent the subsequent closing of contacts 29 from short circuiting the winding of the blocking relay 39. The opening of contacts 41 of the blocking relays 39 is also accompanied by the opening of one or more of the contacts 40 in the trip circuit, thereby preventing energization of trip coil 13. It will be observed that the opening of any one of the sets of contacts 40 blocks tripping so that I have provided separate means in each of the several phase conductors of the system being protected to distinguish between faults and out-of-step conditions wherein any one of these separate means serves to block tripping by the protective relays in phase conductors other than the one in which the blocking originated as well as in the same phase conductor.

As was described in a detailed manner above, tripping of faults which occur during a power-swing condition may be accomplished by closing manual switch 50 whereupon a circuit in parallel to the serially arranged contacts 40 is provided for a short interval of time during each period of a power swing. For three-phase faults, however, this parallel circuit is never completed since the contacts 37 of the fault detector never reclose and, consequently, it is necessary to depend for such tripping upon the closure of the contacts 48 of the timing unit 43 after a predetermined time delay.

In the protective scheme described above wherein a distance relay is provided for each phase conductor of a polyphase system and blocking of effective operation of such distance relays may be initiated by the operation of a blocking relay associated with any phase conductor, a separate blocking relay for each phase conductor was illustrated. I have discovered that, in certain applications, the same desirable operating characteristics may be obtained by utilizing only a single blocking relay in a polyphase system. Accordingly, in Fig. 3, I have illustrated a protective system utilizing transmitted auxiliary current control such as carrier current and distance relays in which the out-of-step blocking scheme described above is employed utilizing only a single blocking relay for a polyphase system. As will be understood by those skilled in the art, a distance protective arrangement when utilized with the addition of a carrier current protective system functions in the same manner as a distance protective arrangement without the addition of the carrier current system in so far as the first or instantaneous time zone of the distance relays is concerned and the addition of the carrier current system is provided merely to permit instantaneous operation of the circuit breakers at each end of the protected section for faults occurring near the end of the section outside the reach of the distance relays at one end.

Accordingly, the protective system illustrated in Fig. 3 is in many respects identical or at least similar to that disclosed in Fig. 1 and the corresponding parts thereof are designated by the same reference numerals as in Fig. 1. Also, only one end of the protected section 10 of the alternating-current system is shown in the drawings but it should be understood that similar protective apparatus will be provided at the remote end of the system including the carrier-current apparatus whereby section 10 may be isolated instantaneously by operation of circuit breaker 12 and the circuit breaker at the remote end of section 10 for phase faults located anywhere within this section.

In order that the starting relays may be used to control the transmission and receipt of carrier current, it is necessary for starting relays 25 to have more sets of contacts than can conveniently be operated by movable contact-controlling members 28 and, accordingly, I provide a starting auxiliary relay 52 which is energized from a suitable source of direct current whenever any one of the starting relays 25 closes its contacts 49 and the corresponding fault detector 33 closes its normally open contacts 53. These contacts 53 are designated by the appropriate subscript depending upon the particular fault detector with which they are associated. Instead of the contacts 49 of the starting units directly controlling the timing unit motor as in Fig. 1, this timing unit motor is controlled indirectly through the operation of starting auxiliary relay 52 closing its normally open contacts 54. In addition to normally open contacts 54, starting unit auxiliary relay 52 is provided with normally open contacts 55 and 56 and normally closed contacts 57.

In order to change the ohmic setting of the ohm units 20 of the distance relays of Fig. 3 to obtain a second time step which is not shown in Fig. 1, timing unit 43 is provided with an additional set of contacts 58 which are bridged by contact-controlling member 47 a predetermined time after energization of motor 44 and sometime prior to bridging of contacts 48 by member 47. Timing motor 44 is energized upon closure of normally open contacts 54 of starting auxiliary relay 52 and contacts 58 are connected in series with contacts 54 so that, upon closure of contacts 54 and 58, a plurality of auxiliary relays 59A, 59B, and 59C, one for each of the ohm units 20, are energized. The auxiliary relays 59 are provided with suitable contact-controlling members for changing the taps on variable tap autotransformers 60A, 60B, and 60C, respectively, which are connected across the appropriate terminals of potential transformers 31 and 32 and to potential windings 22 of ohm units 20 so as to vary the energization of these potential windings and, consequently, the setting of the ohm units 20 a predetermined time after starting auxiliary relay 52 has initiated operation of timing unit 43.

As will be understood by those skilled in the art, one of the system conductors may serve as a channel for the transmitted auxiliary current with ground acting as the return path. In Fig. 3, the conductor 10c has been illustrated as the channel upon which there may be superposed at each end of the line section an alternating current of a frequency differing from the frequency of the system power current. At each end of line section 10, there is provided a suitable transmitter 61 and receiver 62 for transmitting and receiving this auxiliary current of a frequency different from the system frequency and generally of a frequency very much higher than the system frequency. Since the transmitting and receiving means 61 and 62 are well known in the art, they have merely been schematically illustrated in the drawings together with the associated coupling and tuning means generally illustrated at 63. For simplicity and economy, the transmitters 61 at each end of line section 10 are tuned to the same frequency and the receivers 62 are tuned to this frequency and so connected that transmission by either transmitter 61 will energize both the receivers 62 at either end of line section 10. In order to confine the superposed transmitted auxiliary current, commonly called "carrier current," to the line section 10 in question, the line section conductor 10c to which the transmitters 61 are coupled is provided with suitable trap circuits 64. By using adequate power in the transmitter and a relatively insensitive receiver, it is possible to obtain freedom from interference which might otherwise be caused by static and arcing grounds.

Although any of the several types of carrier-current protective schemes may be employed, I have chosen to illustrate my invention as applied to a protective system in which the carrier current is utilized to block tripping of the protective relays. In other words, when carrier is received, tripping of the protective relays is prevented and, if the carrier signal is not received from either of the transmitters, tripping may occur if the protective relays so indicate. Three different systems of carrier relaying using the carrier signal to block tripping may be utilized, namely, the intermittent system where carrier is transmitted only to prevent tripping at times of an external fault, the continuous system in which the carrier signal is continuously received and transmitted except at the time of a fault in the protected section when carrier is interrupted to permit tripping, and a combination of the continuous and intermittent systems in which a carrier signal is transmitted for a brief instant whenever a fault occurs and, if it is desired to prevent tripping of the protective relays, the carrier or auxiliary current is continued whereas, if the fault is in the protected section, the operation of the carrier transmitter is immediately stopped. I have chosen to illustrate my invention in connection with a carrier-current system of the latter type which combines the advantages of both the intermittent and continuous types of carrier-current systems.

In order to insure the initiation or the transmission of carrier for a brief interval of time whenever a fault occurs on the system, I provide each of the fault detectors 33 with normally closed contacts 65 serially arranged so as to apply a negative potential directly to the control electrode 61a (see Fig. 4) of the transmitter 61, which control electrode is connected to a suitable positive potential through a current-limiting resistor 61b. Whenever any one of the normally closed contacts 65A, 65B, or 65C are open upon operation of any one of the fault detectors 33 indicating a fault somewhere in the alternating-current system although it might be external to protected line section 10, then the negative bias from control electrode 61a is removed and the transmitter is permitted to operate to transmit carrier over the channel 10c. If one or more of the directional relays, such as starting units 25, operate to close their contacts 49 to indicate that the fault is in a direction so that it might be within the protected section 10 of the alternating-current system, it is desirable to stop the transmission of carrier current and permit tripping if the distance relays indicate that such tripping is desirable. Accordingly, I provide a circuit paralleling the serially arranged contacts 65 of fault detectors 33 which includes the normally open contacts 56 of starting auxiliary relay 52, the closure of which reapplies negative potential to the control electrode 61a of transmitter 61 to stop the transmission of carrier.

The carrier receiver at each end of the line is arranged to control a carrier receiver relay generally indicated at 66 which has a winding 67 connected in series with the carrier receiver auxiliary relay 68. Whenever carrier is transmitted, winding 67 is energized to cause receiver relay 66 to open its contacts 69, which contacts are connected in the trip circuit of trip coil 13 in parallel with the contacts 24 of ohm units 20 and the contacts 29 of starting units 25 which latter control the instantaneous tripping of circuit breaker 12 in the event of a fault within the range for which ohm units 20 are set to operate. If the fault is still in protected section 10, however, but outside the reach of ohm units 20 with respect to instantaneous operation thereof, tripping of circuit breaker 12 may occur through the contacts 69 of receiver relay 66, providing no carrier is transmitted over conductor 10c. If receiver relay 66 were only provided with winding 67, then the contacts 69 thereof would be in the closed position when no carrier current is received by receiver 62. However, false tripping could result on external fault conditions if the contacts 69 were not opened fast enough or before the remainder of the tripping circuit had been completed. Consequently, I have provided a holding coil 70 on receiver relay 66 which is arranged to be energized from a direct-current source through normally closed contacts 57 of starting auxiliary relay 52. Under normal conditions, with starting auxiliary relay 52 deenergized, the holding coil 70 of receiver relay 66 is energized to maintain contacts 69 in the open position. Whenever a fault occurs, starting auxiliary relay 52 is energized to interrupt the energization circuit of holding coil 70 of receiver relay 66 and, if no carrier is transmitted by the transmitter 61 at either end of line section 10, the receiver relay 66 will permit contacts 69 to be closed.

Receiver auxiliary relay 68 is provided with contacts 71 which may operate a carrier-controlled alarm of some sort, not shown.

In order to be sure that the various relay contacts have had time to reset immediately following the clearing of an external fault, receiver auxiliary relay is provided with an additional set of contacts 72 for energizing the holding coil 70 to maintain the contacts 69 in the open position even though the transmission of carrier has been stopped and the starting auxiliary relay 52 has not yet been deenergized to close its contacts 57 and provide the normal energization for holding coil 70 of receiver relay 66. To accomplish this purpose properly, receiver auxiliary relay 68 should inherently have a short time-delay dropout characteristic.

The carrier-current channel 10c may also be used for telemetering and, to prevent such telemetering action from operating receiver auxiliary relay 68 to close contacts 71 initiating a carrier-controlled alarm, the fault detectors 33 are each provided with a set of normally closed contacts 73 designated by the appropriate subscripts A, B, or C, which contacts are connected in series to short circuit the winding of the receiver auxiliary relay 68 whenever no fault exists on the system and telemetering is permissible.

It will be understood that, although my protective system is primarily concerned with protecting line section 10 from phase faults thereon, suitable means will also be provided for protecting against ground faults and, to this end, I have schematically illustrated contacts 74 connected in the trip circuit of circuit breaker 12 which may be operated by a suitable ground-fault protective means, not shown.

Instead of providing three blocking relays 39 as indicated in Fig. 1, I provide a single blocking relay 39' which has two sets of normally closed contacts 40' and 41' corresponding to the contacts 40 and 41 of blocking relays 39A, 39B, and 39C of Fig. 1. As in Fig. 1, the contacts 40' are connected in the trip circuit of circuit breaker 12 so that tripping is prevented except on the third time step through contacts 48 of timing unit 43 when contacts 40' of blocking relay 39' are open. Blocking relay 39' is energized in the same manner as in Fig. 1, based on the progression-of-events theory referred to above. In other words, whenever any one of the fault detectors 33 is energized sufficiently in advance of the energization and operation of starting units 25 to indicate a power swing on the alternating-current system including the line section 10, then blocking relay 39' is energized and, after a predetermined delay, opens its normally closed contacts 40' and 41'. If, however, fault detectors 33 and starting units 25 operate substantially simultaneously, which is not the case under power-swing conditions, then starting auxiliary relay 52 is energized to close its normally open contacts 55 and short circuit the winding of blocking relay 39' through its normally closed contacts 41' in the same manner as was described in detail in connection with Fig. 1.

It will be observed that, with the arrangement illustrated in Fig. 3, only a single blocking relay 39' is provided and yet, if the electrical conditions of any phase conductor are such as to indicate a power swing, blocking will be initiated to prevent false tripping of circuit breaker 12 or of the circuit breaker at the remote end of line section 10.

The operation of the protective system illustrated in Fig. 3 will be obvious to those skilled in the art from the elementary diagram shown in Fig. 4 where the corresponding parts thereof are designated by the same reference numerals as in Fig. 3. The operation of the power-swing blocking scheme will be identical with that described in detail in Fig. 1 and the operation of the carrier-protective arrangement will be obvious in view of the detailed description included above.

While I have described what I at present consider the preferred embodiments of my invention, it will be obvious to those skilled in the art that various changes and modifications may be made without departing from my invention and I, therefore, aim in the appended claims to cover all such changes and modifications as fall within the true spirit and scope of my invention.

What I claim as new and desire to secure by Letters Patent of the United States is:

1. An arrangement for controlling a circuit interrupting means for isolating one section of a sectionalized polyphase alternating current system from another section comprising electroresponsive protective devices for causing the operation of said circuit-interrupting means in the event of a fault on said one section, means for distinguishing between an asynchronous condition on said system and a fault condition on said system, and means responsive to predetermined electrical conditions on a particular phase conductor of said system for blocking false effective operation of said electroresponsive devices associated with any other phase conductors of said system in the event that said means for distinguishing between an asynchronous condition and a fault condition indicates an asynchronous condition on said system.

2. An arrangement for controlling a circuit interrupting means for isolating one section of a sectionalized polyphase alternating current system from another section comprising electroresponsive protective devices for causing the operation of said circuit-interrupting means in the event of a fault on said one section, means for distinguishing between an asynchronous condition on said system and a fault condition on said system, and means responsive to predetermined electrical conditions on a particular phase conductor of said system for blocking false effective operation of said electroresponsive devices associated with the same or any other phase conductors of said system in the event that said means for distinguishing between an asynchronous condition and a fault condition indicates an asynchronous condition on said system.

3. A control arrangement for use with a polyphase alternating-current electric circuit subject to faults and power swings comprising a plurality of fault-responsive relay means each associated with a different phase conductor of said circuit for controlling the circuit upon the occurrence of faults thereon, and a plurality of means each associated with a different phase conductor of said circuit and each operative in dependence upon the difference in time required by power swings and faults to reach the electrical conditions of the circuit necessary to operate one or more of said relay means for blocking false effective operation of any of said relay means under power-swing conditions.

4. An arrangement for controlling a circuit interrupting means for isolating one section of a sectionalized polyphase alternating current system from another section comprising distance-responsive protective devices for causing the operation of said circuit-interrupting means in the event of a fault on said one section, a plurality of means each associated with a different phase conductor of said circuit and each operative in dependence upon the difference in time required by power swings and faults to reach the electrical conditions of the circuit necessary to operate said distance-responsive protective devices for distinguishing between fault conditions and power-swing conditions, and means responsive to predetermined electrical conditions on one phase conductor of said system for blocking false effective operation of said distance-responsive protective devices associated with any other phase conductors of said system in the event of a power-swing condition on said system.

5. An arrangement for controlling a circuit interrupting means for isolating one section of a sectionalized polyphase alternating current system from another section comprising distance-responsive protective devices for causing the operation of said circuit-interrupting means in the event of a fault on said one section, a plurality of means each associated with a different phase conductor of said circuit and each operative in dependence upon the difference in time required by power swings and faults to reach the electrical conditions necessary to operate said distance-responsive protective devices for distinguishing between fault conditions and power-swing conditions on said system, and a blocking relay connected so as to operate whenever any of said last-mentioned means indicate a power-swing condition on said system for blocking false effective operation of said distance-responsive protective devices associated with any phase conductors of said system in the event of a power-swing condition on said system.

6. A control arrangement for use with a polyphase alternating-current electric circuit subject to faults and power swings comprising a fault-responsive relay means for each phase conductor of said electric circuit for controlling said circuit upon the occurrence of faults thereon, a pair of electroresponsive devices for each phase conductor of said circuit and energized in accordance with predetermined voltage and current conditions of said circuit, one of said electroresponsive devices being responsive to more remote fault conditions on said circuit than the other of said devices, a blocking relay associated with each pair of electroresponsive devices and adapted to operate from one circuit-controlling position to another when one of said associated pair of electroresponsive devices operates a sufficient time in advance of the operation of said other electroresponsive device of said pair to prevent false effective operation of said relay means associated with any phase conductor of said system upon the occurrence of a power swing on said system.

7. An arrangement for controlling a circuit interrupting means for isolating one section of a sectionalized polyphase alternating current system from another section comprising distance-responsive protective devices for causing the operation of said circuit-interrupting means in the event of a fault on said one section, a plurality of means each associated with a different phase conductor of said circuit and each operative in dependence upon the difference in time required by power swings and faults to reach the electrical conditions necessary to operate said distance-responsive protective devices for distinguishing between fault conditions and power-swing conditions on said system, and a blocking relay constructed so as to operate a predetermined time after energization thereof connected so as to operate whenever any of said last-mentioned means indicate a power-swing condition on said system for blocking false effective operation of said distance-responsive protective devices associated with any phase conductors of said system in the event of a power-swing condition on said system causing operation of any of said distance-responsive protective devices.

8. An arrangement for controlling a circuit interrupting means in a polyphase alternating-current circuit comprising a pair of fault-responsive means associated with each phase conductor of said circuit and respectively responsive to faults involving the associated phase conductor and occurring within different ranges of distances on said circuit, means responsive to the simultaneous operation of both of the fault-responsive means associated with any phase conductor for effecting the operation of said circuit-interrupting means, and means responsive to the operation of a predetermined one of any pair of said fault-responsive means for a predetermined time interval before the other fault-responsive means of the same pair operates for rendering all of said fault-responsive means inoperative to effect the operation of said circuit-interrupting means.

9. An arrangement for controlling a circuit interrupting means in a polyphase alternating-current circuit comprising a pair of fault-responsive means associated with each phase conductor of said circuit and respectively responsive to faults involving the associated phase conductor and occurring within different ranges of distances on said circuit, and means dependent upon the manner in which each pair of fault-responsive means are operated for effecting the operation of said circuit-interrupting means under predetermined fault conditions and for preventing the operation of said circuit-interrupting means by any fault-responsive means under asynchronous conditions on said system.

ALBERT R. van C. WARRINGTON.